United States Patent
Takahashi et al.

(10) Patent No.: US 8,041,108 B2
(45) Date of Patent: Oct. 18, 2011

(54) COLOR EXTRACTION METHOD AND APPARATUS

(75) Inventors: Kunikazu Takahashi, Kawasaki (JP); Kenji Kodama, Oita (JP); Teruo Shimomura, Oita (JP)

(73) Assignee: Fujitsu Limited, Kawasaki (JP)

( * ) Notice: Subject to any disclaimer, the term of this patent is extended or adjusted under 35 U.S.C. 154(b) by 889 days.

(21) Appl. No.: 12/046,875

(22) Filed: Mar. 12, 2008

(65) Prior Publication Data

US 2008/0165205 A1    Jul. 10, 2008

Related U.S. Application Data

(63) Continuation of application No. PCT/JP2006/318477, filed on Sep. 19, 2006.

(30) Foreign Application Priority Data

Sep. 26, 2005    (JP) .................................. 2005-277532

(51) Int. Cl.
*G06K 9/00*    (2006.01)
(52) U.S. Cl. ..................................................... 382/165
(58) Field of Classification Search .......... 382/162–167, 382/282–283, 173, 305; 345/589–604; 358/515–538

See application file for complete search history.

(56) References Cited

U.S. PATENT DOCUMENTS

| 6,906,727 | B2 | 6/2005 | Weibrecht et al. |
| 7,920,716 | B2 * | 4/2011 | Sato et al. .................... 382/103 |
| 2002/0131634 | A1 | 9/2002 | Weibrecht et al. |

FOREIGN PATENT DOCUMENTS

| JP | 2000-222673 | 8/2000 |
| JP | 2005-111852 | 4/2005 |
| JP | 2007-129277 | 5/2007 |
| WO | 94/08422 | 4/1994 |
| WO | 2005/055893 A1 | 6/2005 |
| WO | 2007/139035 | 12/2007 |

OTHER PUBLICATIONS

Machine Translation of Japan Patent Application, JP-2000-222673, pp. 1-7, 2000.*
Japanese Office Action issued Nov. 24, 2010 in corresponding Japanese Patent Application 2007-536481.
European Search Report mailed Dec. 18, 2009 in corresponding European Patent Application 06798088.8.

* cited by examiner

*Primary Examiner* — Ishrat I Sherali
(74) *Attorney, Agent, or Firm* — Staas & Halsey LLP

(57) ABSTRACT

This invention is a technique to presume colors of an image. A color extraction method according to this invention include a luminance calculation step of calculating a luminance in a color extraction region, which is included in an image and from which a color is to be extracted, and storing the calculated luminance into a storage device; a color name extraction of referring to a luminance database storing a color name and a luminance corresponding to the color name to extract a color name in the color extraction region by using, as a main judgment element, the luminance in the color extraction region, which is stored in the storage device. As a result, it is possible to presume a color even in a case of the monochromatic image or color image photographed in the night.

6 Claims, 8 Drawing Sheets

| CAR BODY COLOR | R (RED) | G (GREEN) | B (BLUE) | Y (LUMINANCE) | Cb (CHROMINANCE) | Cr (CHROMINANCE) |
|---|---|---|---|---|---|---|
| BLACK | 0 | 0 | 0 | 0.0 | 0.0 | 0.0 |
| BLUE | 0 | 0 | 255 | 29.1 | 127.0 | -20.7 |
| PURPLE | 128 | 0 | 128 | 52.9 | 42.4 | 53.6 |
| DEEP GREEN | 0 | 86 | 56 | 56.9 | -0.5 | -40.6 |
| SAPPHIRE | 0 | 81 | 154 | 65.1 | 50.2 | -46.4 |
| RED | 255 | 0 | 0 | 76.2 | -43.0 | 127.0 |
| GREEN | 0 | 255 | 0 | 149.7 | -84.5 | -106.8 |
| YELLOW | 255 | 255 | 0 | 225.9 | -127.5 | 20.7 |
| WHITE | 255 | 255 | 255 | 255.0 | 0.0 | 0.0 |

| SUN ALTITUDE | CORRECTION AMOUNT (LOWER LIMIT) | CORRECTION AMOUNT (UPPER LIMIT) |
|---|---|---|
| 90~15 | -15 | 5 |
| 15~0 | -10 | 10 |
| 0~-90 | -5 | 20 |
| NO PHOTOGRAPHING CONDITION INFO. | -15 | 15 |

# COLOR EXTRACTION METHOD AND APPARATUS

CROSS-REFERENCE TO RELATED APPLICATIONS

This application is a continuing application, filed under 35 U.S.C. section 111(a), of International Application PCT/JP2006/318477, filed Sep. 19, 2006.

TECHNICAL FIELD OF THE INVENTION

This invention relates to a technique for extracting colors of an image in which the colors are unclear or unknown.

BACKGROUND OF THE INVENTION

In a system that carries out movement observation of cars based on car images taken by a camera provided on a road, it has been carried out that a registration number of the car and a body color of the car are identified from the car images, and the cars to be searched is narrowed by comparing the registration number of the car and the body color of the car with a predetermined database. In addition, for example, JP-A-2000-222673 discloses a technique to identify the body color of the car from the color image in which the car is photographed, and narrow the cars to be searched based on the registration number of the car and the body color of the car.

However, when the car image is a color image, it is possible to identify the registration number of the car and the body color of the car as described above. However, when the car image is a monochromatic image or a color image photographed in the night (here, a color image photographed in a state where sufficient brightness cannot be secured), the registration number of the car can be identified, but the body color of the car cannot be identified. Therefore, in the night, it was impossible to narrow the cars to be searched by the body color of the car. Incidentally, in the aforementioned publication, by providing the light, which synchronizes with the shutter of the camera, the sufficient brightness is secured even in the night or in a dark place such as the underground to identify the body color of the car. However, only the brightness in a level that the body color of the car can be identified is secured, and this publication does not indicate any technique to presume the body color of the car from the monochromatic image or the color image photographed in the night.

In addition, for example, JP-A-2005-111852 discloses an image conversion technique from the monochromatic image to the color image. Specifically, a technique is disclosed that, in a copy machine, in a case where a print request of a color image is received even when a document is a monochromatic image, the monochromatic image is printed as a color image based on a small storage medium attached to the document. However, this is not a technique to presume the colors from the monochromatic image.

SUMMARY OF THE INVENTION

For example, in the Munsell color system, the color is represented based on the three attributes of the hue, luminance and chroma. However, information of the hue and chroma is not sufficiently included in the monochromatic image or the color image photographed in the night. Therefore, the color cannot be presumed by the conventional arts when the image is a monochromatic image or a color image photographed in the night.

Therefore, an object of this invention is to provide a technique to presume the colors of the image.

A color extraction method according to a first aspect of this invention includes a luminance calculation step of calculating a luminance in a color extraction region that is included in an image and is a target of the color extraction, and storing the luminance into a storage device; a color name extraction step of referring to a luminance database storing a color name and a luminance corresponding to the color name to extract a color name in the color extraction region by using, as a main judgment element, the luminance in the color extraction region, which is stored in the storage device.

By doing so, even when the image is, for example, a monochromatic image or an image, which does not sufficiently include information of the hue or chroma (for example, a color image photographed in the night), the color can be presumed. In addition, in a case of the car image, because it is possible to presume the body color of the car from the monochromatic image or the color image photographed in the night, it is possible to narrow the cars to be searched, by using the body color of the car even in the night. In case of the car, because the number of body colors of the cars is infinite, it is possible to appropriately extract the body color of the car when the luminance database is configured so as to match with the realities.

In addition, the aforementioned luminance calculation step may include: a step of, when information of photographing date and time and photographed place of the image is received, calculating a sun altitude based on the information of the photographing date and time and photographed place; and a step of reading out a correction amount of the luminance, which corresponds to the calculated sun altitude from a luminance correction database storing the sun altitude and the correction amount of the luminance, and calculating a possible range of the luminance in the color extraction region based on the luminance in the color extraction region and the correction amount of the luminance. Then, in the color name extraction step, the luminance database may be referenced to extract the color name in the color extraction region in the aforementioned possible range.

By doing so, because the possible range of the luminance, for which the sun altitude is taken into account, is calculated and the color name is extracted in the possible range of the luminance, it is possible to extract the original color without omission. For example, because the sun light does not exist in the night, the luminance of the image may be lower than the original one, and by the influence of the sun light, the luminance of the image in the daytime may be higher than the original one. In addition, by the influence of the sun light, the luminance of the image in the early morning or the evening may be different from the original one. Thus, even when the luminance of the image is different from the original one by the influence of the sun light, it is possible to extract the original color.

Furthermore, the image may be an image in which the car is photographed. Then, this invention may further include a step of extracting a hood region of the car from the image in which the car is photographed. For example, in case of the car image, by extracting, as a color extraction region, the hood region, it is possible to exactly extract the luminance of the car portion.

A color extraction method according to a second aspect of this invention includes: a luminance calculation step of calculating a luminance in a color extraction region for which a color is to be extracted and which is included in a monochromatic image or a color image whose color component other than the luminance is less than a predetermined level, and storing the calculated luminance into a storage device; and a color name extraction step of referring to a luminance database storing a color name and a luminance corresponding to the color name to extract a color name corresponding to the luminance in the color extraction region, which is stored in the storage device. Thus, even in case of the monochromatic image or color image whose color component (e.g. hue or chroma) other than the luminance is less than the predetermined level, the color can be presumed.

A color extraction method according to a third aspect of this invention includes: a luminance calculation step of calculating a luminance in a color extraction region for which a color is to be extracted, which is included in an image, and storing the calculated luminance into a storage device; and a color name extraction step of extracting a color name in the color extraction region from only the luminance in the color extraction region, which is stored in the storage device by referring to a luminance database storing a color name and a luminance corresponding to the color name. Thus, the color of the image can be presumed only from the luminance.

Incidentally, a program for causing a computer to execute the color extraction method according to this invention can be created, and the program is stored in a storage medium or a storage device such as flexible disk, CD-ROM, a magneto-optic disk, a semiconductor memory or hard disk. In addition, the program may be distributed by digital signals through a network. Incidentally, data during the processing is temporarily stored in a storage device such as a memory of a computer or the like.

DETAILED DESCRIPTION OF THE PREFERRED EMBODIMENTS

Figure 1:
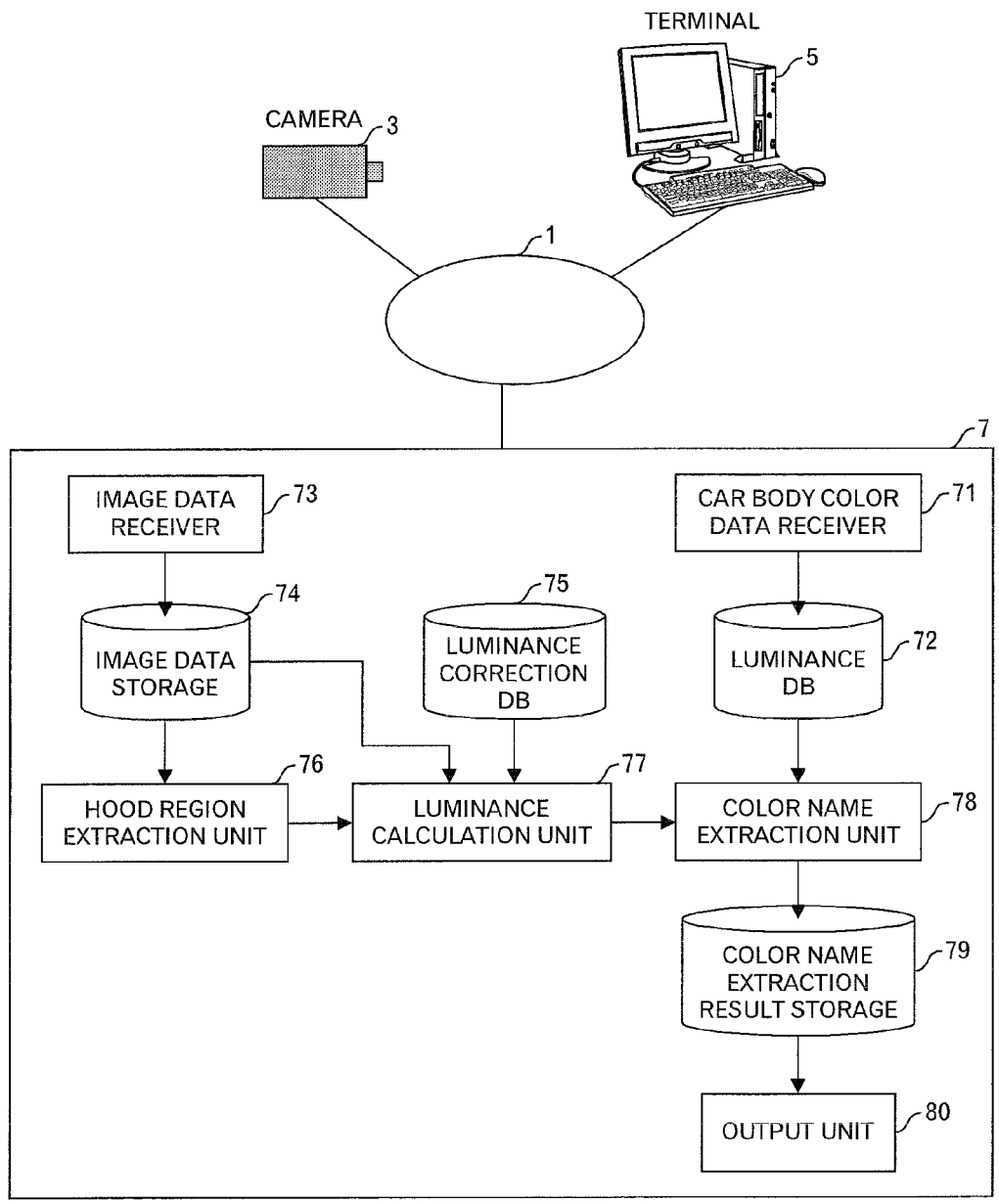
FIG. 1 is a system outline diagram according to an embodiment of this invention.

FIG. 1 shows a system outline according to one embodiment of this invention. A camera 3, a terminal 5 and a color extraction apparatus 7 that carries out a main processing in this embodiment are connected with a network 1. The camera 3 is placed on roads, and is configured to automatically photograph running cars. Incidentally, the number of placed cameras 3 and the placed positions are arbitrary. The terminal 5 is operated by a user who uses the color extraction apparatus 7, and, for example, is used to register data into a luminance DB 72 described later.

The color extraction apparatus 7 has a car body color data receiver 71 that receives car body color data including a color name and RGB values, and calculates the luminance from the RGB values; a luminance DB 72 that stores the car body color data received by the car body color data receiver 71 and the calculated luminance; an image data receiver 73 that receives image data from the camera 3; an image data storage 74 that stores the image data that the image data receiver 73 received; a luminance correction DB 75 that stores correction amounts of the luminances; a hood region extraction unit 76 that extracts a hood region of the car from the image data stored in the image data storage 74; a luminance calculation unit 77 that calculates a luminance in the hood region of the car based on information of the hood region of the car, which was extracted by the hood region extraction unit 76 and data stored in the luminance correction DB 75; a color name extraction unit 78 that extracts a color name corresponding to the luminance based on the luminance calculated by the luminance calculation unit 77 and data stored in the luminance DB 72; a color name extraction result storage 79 that stores the extraction result of the color name extraction unit 78, and an output unit 80 that outputs the color name stored in the color name extraction result storage 79.

Figures 2, 3:
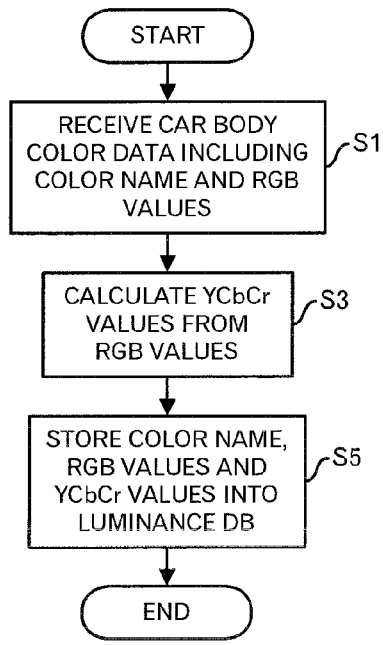
FIG. 2 is a diagram showing a processing flow according to the embodiment of this invention.
FIG. 3 is a diagram showing an example of data stored in a luminance DB.

Next, processing contents of the system shown in FIG. 1 will be explained by using FIGS. 2 to 12. Firstly, a processing to register data into the luminance DB 72 will be explained by using FIGS. 2 and 3. A user who uses the color extraction apparatus 7 causes the terminal 5 to transmit car body color data to the color extraction apparatus 7. The car body color data receiver 71 receives the car body color data including a color name and RDB values to the terminal 5 (FIG. 2: step S1). The car body color data receiver 71 calculates YCbCr (Y: luminance, Cb: chrominance, Cr: chrominance) values from the received RGB values (step S3). For example, YCbCr values are calculated by using following equations, for example.

$$Y = 0.29900*R + 0.58700*G + 0.11400*B \quad (1)$$

$$Cb = -0.16874*R - 0.33126*G + 0.50000*B \quad (2)$$

$$Cr = 0.50000*R - 0.41869*G - 0.08131*B \quad (3)$$

Here, the value range of each value, as follows: $0 \leq R \leq 255$, $0 \leq G \leq 255$, $0 \leq B \leq 255$, $0 \leq Y \leq 255$, $-128 \leq Cb \leq 127$ and $-128 \leq Cr \leq 127$. Incidentally, the equations to calculate the YCbCr values from the RGB values are not limited to the equations (1) to (3), and the YCbCr values can be calculated by using other equations.

The car body color data receiver 71 stores the color name, RGB values and YCbCr values into the luminance DB 72 (step S5). FIG. 3 shows an example of data stored in the luminance DB 72. In an example of FIG. 3, the car body color, R (red), G (green), B (blue), Y (luminance), Cb (chrominance) and Cr (chrominance) are stored for each color. In the example of FIG. 3, in case of the black color, following values are stored: R (red)=0, G (green)=0, B (blue)=0, Y (luminance)= 0.0, Cb (chrominance)=0.0 and Cr (chrominance)= 0.0. In addition, in case of the blue color, following values are stored: R (red)=0, G (green)=0, B (blue)=255, Y (luminance)= 29.1, Cb (chrominance)=127.0 and Cr (chrominance)=−20.7. In case of the purple color, following values are stored: R (red)=128, G (green)=0, B (blue)=128, Y (luminance)=52.9, Cb (chrominance)=42.4 and Cr (chrominance)= 53.6. In case of the deep green color, following values are stored: R (red)=0, G (green)=86, B (blue)=56, Y (luminance)=56.9, Cb (chrominance)=−0.5 and Cr (chrominance)=−40.6. In case of the sapphire color, following values are stored: R (red)=0, G (green)=81, B (blue)=154, Y (luminance)=65.1, Cb (chrominance)=50.2 and Cr (chrominance)=−46.4. In case of the red color, following values are stored: R (red)=255, G (green)=0, B (blue)=0, Y (luminance)=76.2, Cb (chrominance)=−43.0 and Cr (chrominance)=127.0. In case of the green color, following values are stored: R (red)=0, G (green)=255, B (blue)=0, Y (luminance)=149.7, Cb (chrominance)=−84.5 and Cr (chrominance)=−106.8. In case of the yellow color, following values are stored: R (red)=255, G (green)=255, B (blue)=0, Y (luminance)=225.9, Cb (chrominance)=−127.5 and Cr (chrominance)=20.7. In case of the white color, following values are stored: R (red)=255, G (green)=255, B (blue)=255, Y (luminance)=255.0, Cb (chrominance)=0.0 and Cr (chrominance)=0.0. Incidentally, in the example of FIG. 3, although data for nine colors is stored, data for about 310 colors may be stored in the luminance DB 72, because about 160 colors for Japanese cars and about 150 colors for imported cars exist as the kinds of car colors.

Figure 4:
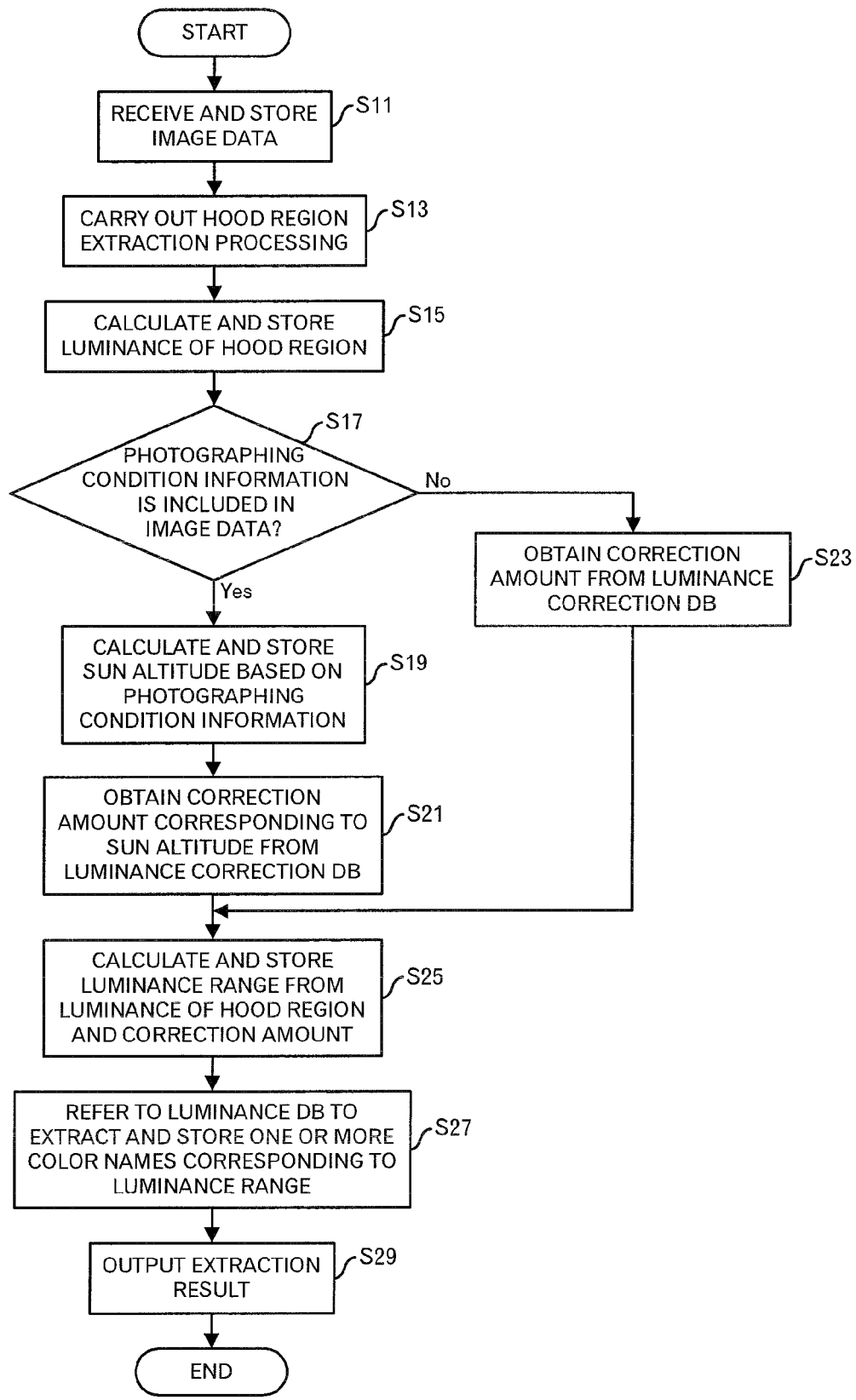
FIG. 4 is a diagram showing a processing flow according to the embodiment of this invention.
Figure 5:
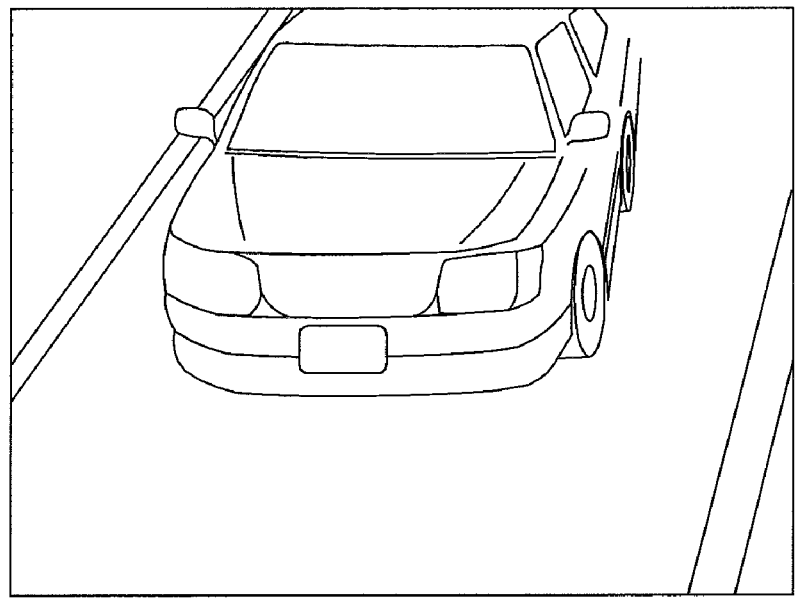
FIG. 5 is a diagram showing an example of a car image.

Next, a processing to presume the car body color from the car image will be explained by using FIGS. 4 to 12. First, the image data receiver 73 receives image data from the camera 3, and stores the received image data into the image data storage 74 (FIG. 4: step S11). The image data includes a car image photographed by the camera 3. Incidentally, the image data may include photographing condition information such as photographing date and time and photographed place. The photographing condition information is described later, and is used to calculate the sun altitude. An example of the car image is shown in FIG. 5.

Figure 6:
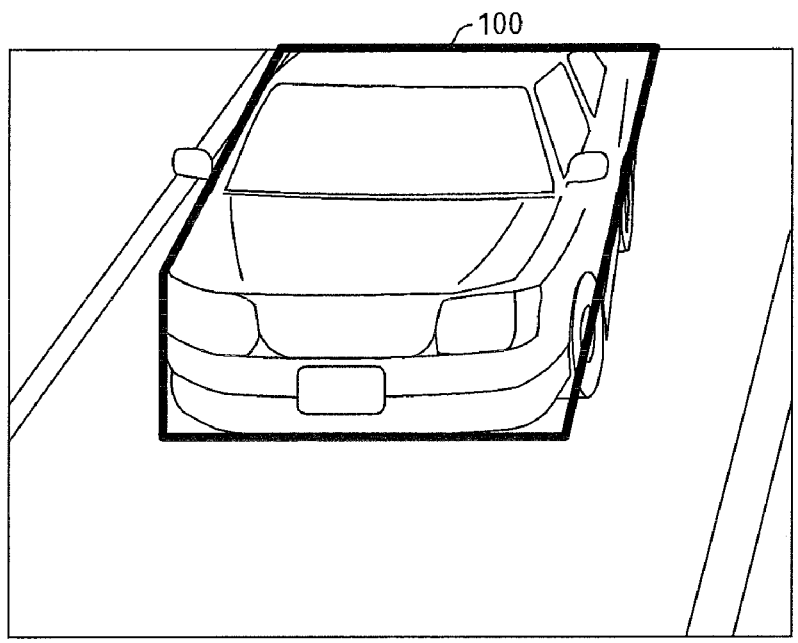
FIG. 6 is a diagram to explain a hood region extraction processing.

The hood region extraction unit 76 reads out the car image from the image data storage 74, and carries out a hood region extraction processing (step S13). Incidentally, in this embodiment, it is assumed that the car body color is presumed by handling the hood region as the color extraction region. The hood region extraction processing will be explained by using FIGS. 6 to 10. First, the hood region extraction unit 76 compares a background image, in which only the background is photographed, with the car image. Then, as shown in FIG. 6, a car portion 100 is identified. Incidentally, it is assumed that the background image has been photographed by the camera 3 and stored in the storage device of the color extraction apparatus 7.

Figure 7:
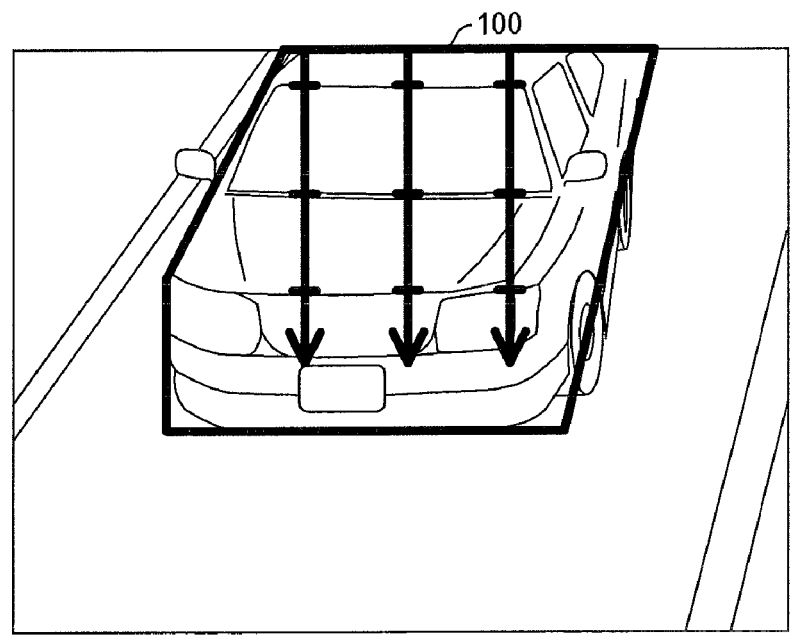
FIG. 7 is a diagram to explain the hood region extraction processing.

Next, the hood region extraction unit 76 vertically scans several positions of the car portion 100 in order to detect edges. An example of vertically scanning the car portion 100 is shown in FIG. 7. In an example of FIG. 7, three positions of the car portion 100 is vertically scanned, and edges are detected at the boundary between the ceiling and the windshield, at the boundary between the windshield and the hood and at the boundary between the hood and the front grille. Incidentally, because the front grille and the edges lower than the front grille are not used, the front grille and the edges lower than the front grille are not considered.

Figure 8:
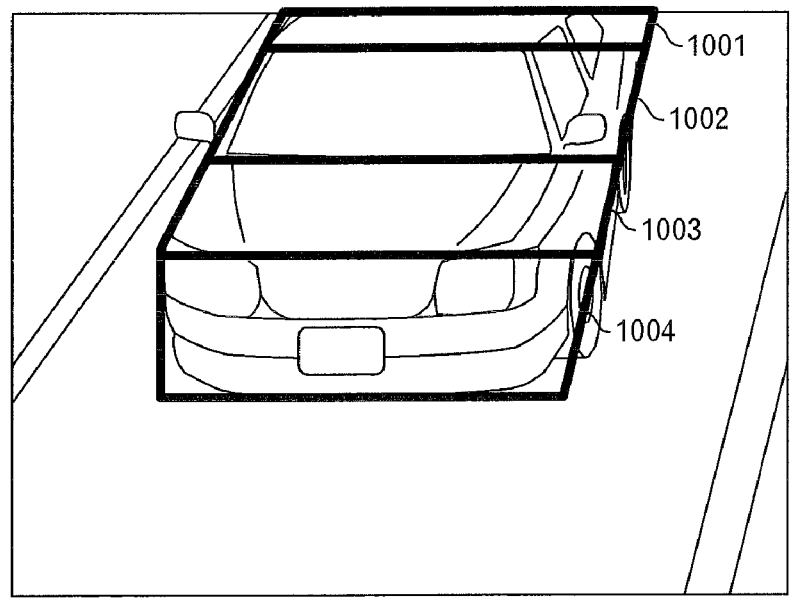
FIG. 8 is a diagram to explain the hood region extraction processing.

The hood region extraction unit 76 divides the car region 100 into several regions based on the detected edges. An example that the car portion 100 is divided is shown in FIG. 8. In the example of FIG. 8, the car portion 100 is divided into regions 1001, 1002, 1003 and 1004. Then, the hood region extraction unit 76 presumes, based on the a predetermined rule and a ratio of the vertical length of each divided region, what portion of the car corresponds to each region. The predetermined rule is to presume the tree regions as being windshield, hood and front grille from the higher region, in a case where the tree successive regions whose ratio of the vertical length of the regions is 1:1:1, for example, exists. In the example, the ratio of the regions 1001, 1002, 1003 and 1004 is 1:3:3:3, and based on the aforementioned predetermined rule, the region 1002 is presumed to be the windshield, the region 1003 is presumed to be hood, and the region 1004 is presumed to be the front grille. Then, the region 1001 is presumed to be the ceiling, because it is higher than the windshield (region 1002). Thus, the hood region is extracted from the car image. Incidentally, the aforementioned predetermined rule is a mere example, and is not limited to this rule. In addition, the hood region extraction region itself is not a main portion of this embodiment, and is disclosed in Japanese Patent Application No. 2006-146775 (filed on May 26, 2006) and its foreign patent application (PCT/JP/2007/060733, and published as WO2007/139035), the content is incorporated into this application.

Figure 9:
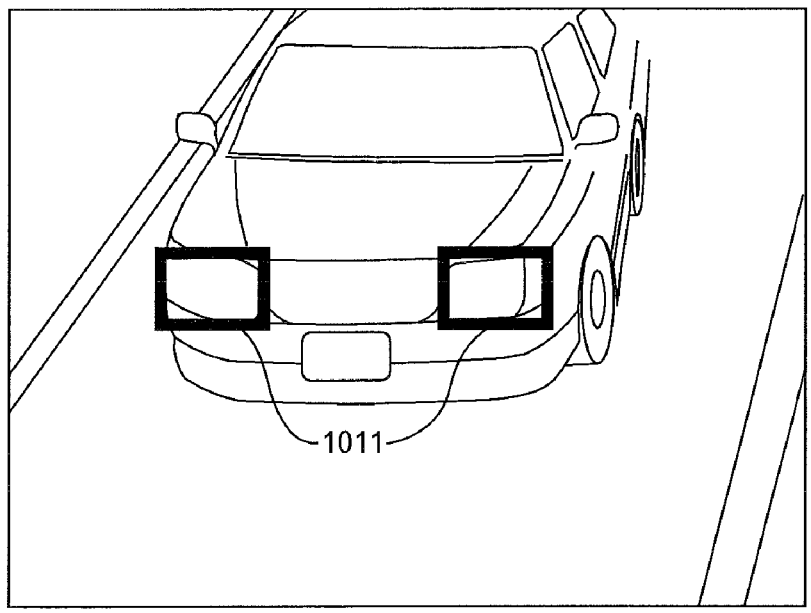
FIG. 9 is a diagram to explain the hood region extraction processing.
Figure 10:
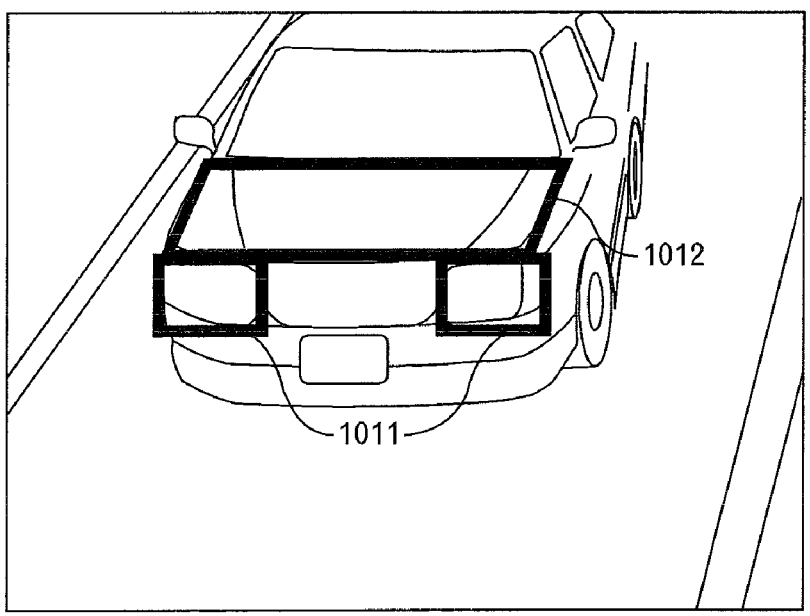
FIG. 10 is a diagram to explain the hood region extraction processing.

In addition, for example, because the car turns on the headlight in the night, the hood region may be extracted based on the headlight. The hood region extraction processing based on the headlight of the car will be explained by using FIGS. 9 and 10. First, the hood region extraction region 76 carries out binarization of the car image by a predetermined threshold (e.g. luminance=128) in order to identify the headlight of the car. Thus, by carrying out the binarization, the reflection light of the car or road or the like can be removed and only a portion whose luminance is high such as an illuminant can be extracted as a headlight candidate region. Then, a region satisfying a predetermined condition is identified, as the headlight region, among the extracted headlight candidate regions. The predetermined condition is an interval between right and left, or the like, for example. As shown in FIG. 9, the region 1011 is identified in the car image, as the headlight region. Incidentally, a technique to extract the headlight region from the car image is well-known. Therefore, the further explanation is omitted.

Then, a region higher than the headlight region is extracted as the hood region. Typically, the hood is located at a portion higher than the headlight, and the width of the hood is the same as that of the headlight. Therefore, as show in FIG. 10, based on the information of the position and the width of the region 1011, the region 1012 is extracted as the hood region. Incidentally, the hood region extraction processing is not limited to the aforementioned processing, and the hood region can be extracted by other methods.

Returning to the explanation of FIG. 4, the luminance calculation unit 77 calculates the luminance of the extracted hood region, and stores the calculated luminance into the storage device such as the main memory (step S15). Here, for example, an average value of the luminances in the hood region is calculated and is handled as the luminance of the hood region. However, another statistic value such as the most frequently appeared value can be adopted. Then, the luminance calculation unit 77 judges whether or not the photographing condition information is included in the image data (step S17). When the photographing condition information is included in the image data (step S17: Yes route), the luminance calculation unit 77 calculates the sun altitude based on the photographing condition information, and stores the calculated sun altitude into the storage device (step S19). For example, the sun altitude α is calculated by using a following equation:

$$\alpha = \arcsin\{\sin(\phi)\cos(\delta) + \cos(\phi)\cos(\delta)\cos(h)\} \quad (4)$$

In the Equation (4), φ represents the latitude, δ represents the sun declination, and h represents the hour angle. The latitude φ, the sun declination δ, and the hour angle h are as follows:

$$\delta = 0.006918 - 0.399912 \cos(\theta o) + 0.070257 \sin(\theta o) - 0.006758 \cos(2\theta o) + 0.000907 \sin(2\theta o) - 0.002697 \cos(3\theta o) + 0.001480 \sin(3\theta o) \quad (5)$$

$$h = (\text{JST} - 12)\pi/12 + \text{the longitude difference from the standard meridian} + Eq \quad (6)$$

$$Eq = 0.000075 + 0.001868 \cos(\theta o) - 0.032077 \sin(\theta o) - 0.014615 \cos(2\theta o) - 0.040849 \sin(2\theta o) \quad (7)$$

$$\theta o = 2\pi (dn-1)/365 \quad (8)$$

Eq represents the equation of time, θo represents a constant defined based on the number dn of days since the new year' day. In addition, in the Equation (6), JST represents the Japanese standard time. Incidentally, the equations for calculating the sun altitude are not limited to the Equations (4) to (8), and the sun altitude can be calculated by using other equations. The sun altitude calculation processing itself is not a main portion in this embodiment, and is disclosed in the Japanese Patent Application No. 2005-317795 (filed on Oct. 31, 2005), and its foreign patent applications, and the content is incorporated into this application.

Figures 11, 12:
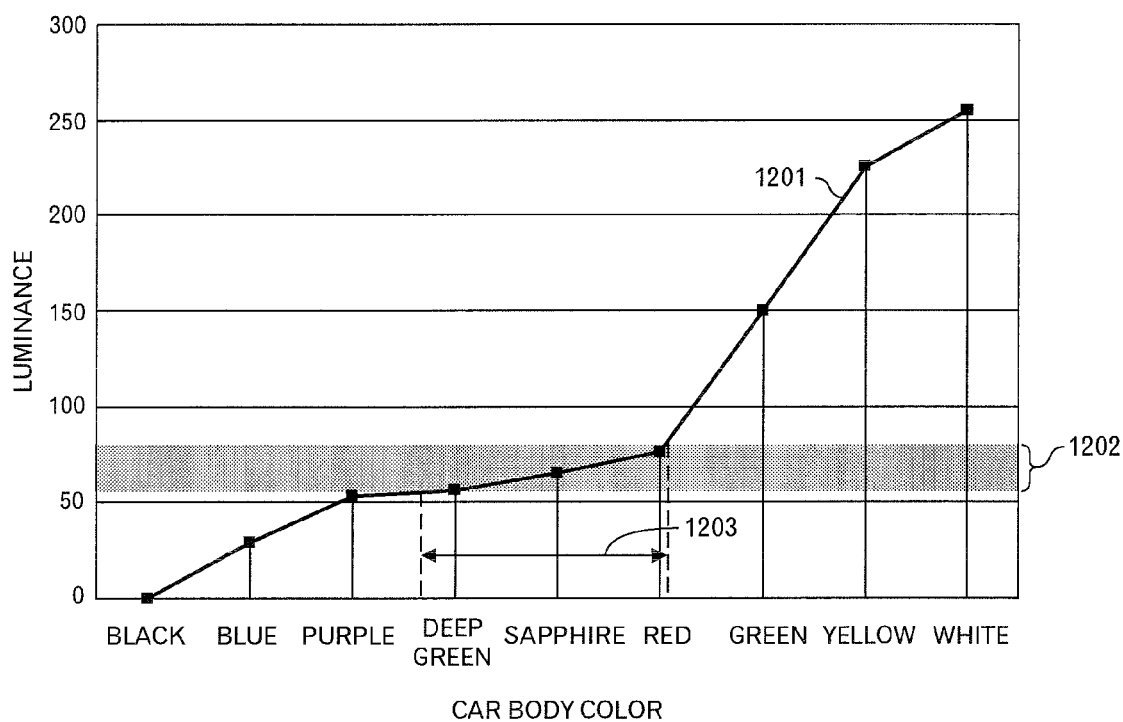
FIG. 11 is a diagram to explain an example of data stored in a luminance correction DB.
FIG. 12 is a diagram to explain a processing for extracting color names.

Next, the luminance calculation unit 77 obtains a correction amount corresponding to the sun altitude from the luminance correction DB 75 (step S21). An example of data stored in the luminance correction DB 75 is shown in FIG. 11. In the example of FIG. 11, the table includes a column of the sun altitude, a column of the correction amount (lower limit), and a column of the correction amount (upper limit). The correction amount (lower limit) is a value used to calculate the lower limit of the luminance range, and the correction amount (upper limit) is a value used to calculate the upper limit of the luminance range. The calculation of the luminance range will be explained later. In addition, in the example of FIG. 11, the correction amount varies according to the sun altitude. For example, when the sun altitude is equal to or greater than 15, because it is a daytime, and there is influence of the sun light, the luminance in the car image may be higher than the original car luminance. In addition, when the sun altitude is less than 0, because it is a night, and there is no sun light, the luminance in the car image may be lower than the original car luminance. Furthermore, when the sun altitude is within a range from 0 to 15, it is an early morning or evening, and the sun light may be affected, even though it is not daytime. Thus, by changing the correction amount according to the sun altitude, the original luminance of the car is prevented from going out from the luminance range. Then, the processing shifts to the processing of the step S25.

On the other hand, when the photographing condition information is not included in the image data (step S17: No route), the luminance calculation unit 77 obtains the correction amount from the luminance correction DB 75 (step S23). At the step S23, because the photographing condition information is not included in the image data, and the sun altitude cannot be calculated, the correction amount in the line of "no photographing condition information" is obtained. Then, the processing shifts to the processing of the step S25.

The luminance calculation unit 77 calculates a luminance range based on the calculated luminance of the hood region and the correction amount obtained from the luminance correction DB 75, and stores the calculated luminance range into the storage device (step S25). The luminance range is a range from "luminance+correction amount (lower limit)" to "luminance+correction amount (upper limit)". For example, a case where the luminance of the hood region is "60" and the sun altitude is "−10" will be explained. Incidentally, data stored in the luminance correction DB 75 is data as shown in FIG. 11. In the example of FIG. 11, in the case where the sun altitude is "−10", the correction amount (lower limit) is "−5", and the correction amount (upper limit) is "20". Therefore, the lower limit of the luminance range is 55=60−5, the upper limit of the luminance range is 80=60+20, and the luminance range is a range from 55 to 80.

Next, the color name extraction unit 78 reads out the luminance range stored in the storage device, refers to the luminance DB 72, extracts one or more color names corresponding to the luminance range, and stores the extracted color name (s) into the color name extraction result storage 79 (step S27). For instance, in a case where data stored in the luminance DB 72 is data shown in FIG. 3, when the luminance range is a range from 55 to 80, three colors, that is, deep green (Y=56.9), sapphire (Y=65.1) and red (Y=76.2) are extracted. In addition, FIG. 12 shows a diagram representing the data shown in FIG. 3 in a graph format. In FIG. 12, the X axis represents the car body color, and Y axis represents the luminance. A polygonal line 1201 in FIG. 12 is a line connecting points of luminances for respective colors. In addition, a halftone portion 1202 represents the luminance range (luminance: 55 to 80). Then, an arrow 1203 in FIG. 12 represents a range of the car body color (X axis) from a point that the polygonal line 1201 and the lower limit of the luminance range cross to the polygonal line 1201 and the upper limit of the luminance range cross. Therefore, when the luminance range is from 55 to 80, the car body colors (deep green, sapphire and red) within a range indicated by the arrow 1203 are extracted.

Next, the output unit 80 outputs the extraction result stored in the color name extraction result storage 79 (step S29). For example, the color name stored in the color name extraction result storage 79 is displayed on a display device or the like. In addition, the colors corresponding to the color names may be displayed based on the Munsell color system. Furthermore, the output unit 80 may transmit the extraction result stored in the color name extraction result storage 79 to the terminal 5, and the terminal 5 may display the extraction result on the display device or the like. Moreover, the extraction result may be outputted to another apparatus that carries out a processing by using the color names.

In addition, when information of color components (e.g. hue or chroma) other than the luminance is in a usable level, the extracted color names may be narrowed.

As described above, according to this embodiment, even when it is the monochromatic image or color image (e.g. the color image photographed in the night) having insufficient information of the hue or the chroma, the color can be presumed. For example, in case of the car image, it becomes possible to narrow the cars to be searched by using the car body color even in the night, and it is also possible to narrow the cars to be searched together with other elements (e.g. registration number). Moreover, for example, in the criminal search, even when it is impossible to identify one car but about 100 cars can be identified among several ten thousand cars, its effect is sufficient.

As described above, although one embodiment of this invention was explained, this invention is not limited to this. For example, this invention can be applied not only to the car image but also other images. In addition, the functional block diagram of the color extraction apparatus 7 shown in FIG. 1 is a mere example, and does not always correspond to an actual program module configuration.

Moreover, the data stored in the luminance correction DB 75 shown in FIG. 11 is a mere example, and the luminance correction DB 75 does not always have to have the aforementioned configuration. For example, the sections of the sun altitude may be small, and the correction amount may be changed according to the weather.

Figure 13:
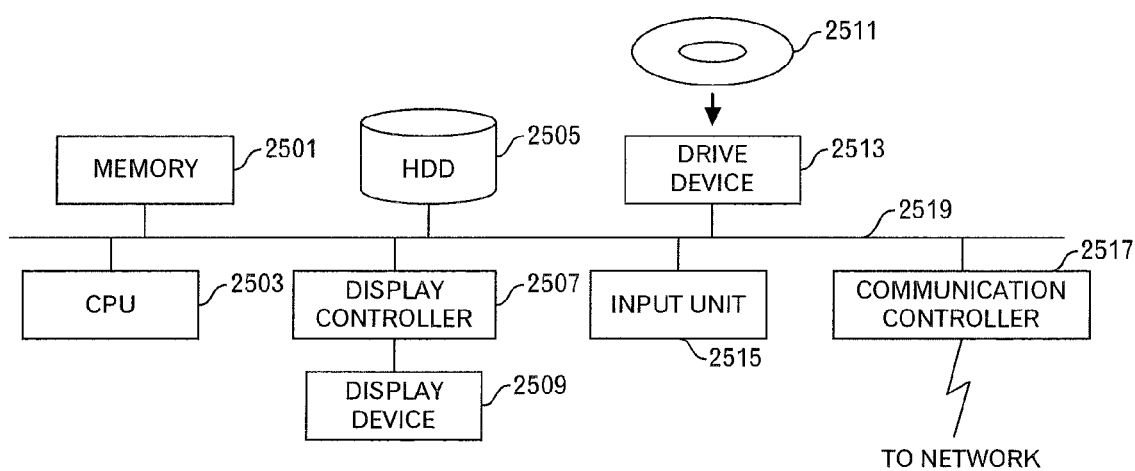
FIG. 13 is a functional block diagram of a computer.

Incidentally, the terminal 5 and the color extraction apparatus 7 are computer devices as shown in FIG. 13. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 13. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

What is claimed is:

1. A color name presuming apparatus for presuming a color name of a predetermined region in a color image, comprising:
    a unit that accepts a color name and RGB values, calculates a luminance in a YCbCr system from said RGB values, and stores said luminance into a storage device in association with said color name;
    a luminance calculation unit that calculates a region luminance in said YCbCr system from RGB values in said predetermined region within said color image upon detecting that said color image is a color image whose color components other than said luminance are less than a predetermined level;
    an extraction unit that extracts a color name corresponding to said region luminance calculated by said luminance calculation unit from said storage device; and
    a unit that outputs said color name extracted by said extraction unit as said color name of said predetermined region.

2. The color name presuming apparatus as set forth in claim 1, wherein said luminance calculation unit comprises:
    a unit that calculates a sun altitude based on information of photographing date and time and photographed place, in response to receipt of said information of said photographing date and time and said photographed place; and
    a unit that reads out a correction amount of said region luminance, which corresponds to the calculated sun altitude, from a luminance correction database storing sun altitudes and correction amounts of said region luminance, and calculates a possible range of said region luminance in said predetermined region based on said region luminance in said predetermined region and said correction amount of said region luminance, and
    wherein said extraction unit extracts color names corresponding to said possible range of said region luminance.

3. A computer-readable storage medium storing a color name presuming program for presuming a color name of a predetermined region in a color image, said program comprising:
    accepting a color name and RGB values, calculating a luminance in a YCbCr system from said RGB values, and storing said luminance into a storage device in association with said color name;
    calculating a region luminance in said YCbCr system from RGB values in said predetermined region within said color image upon detecting that said color image is a color image whose color components other than said luminance are less than a predetermined level;
    extracting a color name corresponding to said region luminance calculated in said calculating said region luminance from said storage device; and
    outputting said color name extracted by said extraction unit as said color name of said predetermined region.

4. The computer-readable storage as set forth in claim 3, wherein said calculating said region luminance comprises:
    calculating a sun altitude based on information of photographing date and time and photographed place, in response to receipt of said information of said photographing date and time and said photographed place; and
    reading out a correction amount of said region luminance, which corresponds to the calculated sun altitude, from a luminance correction database storing sun altitudes and correction amounts of said region luminance, and calculating a possible range of said region luminance in said predetermined region based on said region luminance in said predetermined region and said correction amount of said region luminance, and
    wherein said extracting comprises extracting color names corresponding to said possible range of said region luminance.

5. A color name presuming method for presuming a color name of a predetermined region in a color image, said method comprising:
    accepting a color name and RGB values, calculating a luminance in a YCbCr system from said RGB values, and storing said luminance into a storage device in association with said color name;
    calculating a region luminance in said YCbCr system from RGB values in said predetermined region within said color image upon detecting that said color image is a color image whose color components other than said luminance are less than a predetermined level;
    extracting a color name corresponding to said region luminance calculated in said calculating said region luminance from said storage device; and
    outputting said color name extracted by said extraction unit as said color name of said predetermined region.

6. The method as set forth in claim 5, wherein said calculating said region luminance comprises:

calculating a sun altitude based on information of photographing date and time and photographed place, in response to receipt of said information of said photographing date and time and said photographed place; and reading out a correction amount of said region luminance, which corresponds to the calculated sun altitude, from a luminance correction database storing sun altitudes and correction amounts of said region luminance, and calculating a possible range of said region luminance in said predetermined region based on said region luminance in said predetermined region and said correction amount of said region luminance, and wherein said extracting comprises extracting color names corresponding to said possible range of said region luminance.

* * * * *